United States Patent

Olsson

[15] 3,702,977

[45] Nov. 14, 1972

[54] DEVICE FOR GENERATING MICROWAVE OSCILLATIONS

[72] Inventor: Kjell Olow Ingemar Olsson, 4, Stravagen, 17500 Jakobsberg, Sweden

[22] Filed: Oct. 28, 1971

[21] Appl. No.: 193,444

[52] U.S. Cl. ..............331/107 R, 331/96, 331/107 G

[51] Int. Cl. ..............H03b 7/06

[58] Field of Search ..............331/107, 96, 114

[56] References Cited

UNITED STATES PATENTS

| | | | |
|---|---|---|---|
| 3,231,831 | 1/1966 | Hines | 331/96 |
| 3,509,478 | 4/1970 | Thim | 331/107 G |
| 3,550,035 | 12/1970 | Robrock | 331/114 |

*Primary Examiner*—John Kominski
*Attorney*—Frederick E. Hane et al.

[57] ABSTRACT

A microwave oscillator including two semiconductor devices of a kind which can be switched between two state or which becomes unstable or exhibits negative resistance under the effect of an external electric field exceeding a given threshold value. The two semiconductor devices are mounted within a microwave resonant cavity and are connected in series between the poles of a dc bias voltage source. The common junction point between the semiconductor devices is ac-coupled to the microwave cavity so that the semiconductor devices are driven in push-pull by the ac microwave voltages derived from the microwave cavity and superimposed upon the dc bias voltages from the voltage source. The semiconductor devices may be Gunn-diodes or avalanche diodes. The microwave resonator cavity may consist of a waveguide section provided with tuning devices or a coaxial cavity closed at one end by an end wall.

13 Claims, 7 Drawing Figures

DEVICE FOR GENERATING MICROWAVE OSCILLATIONS

BACKGROUND OF THE INVENTION

1. Field of the Invention

The present invention relates to a device for generating microwave oscillations by means of microwave generating semiconductor devices of the kind which can be switched between two states or which becomes unstable or exhibits negative resistance when exposed to an external dc voltage field exceeding a given threshold value. Microwave generating semiconductor devices of the last mentioned kind are for instance Gunn-diodes and avalanche diodes.

2. Description of the Prior Art

The negative resistance in Gunn-diodes is a bulk-effect appearing in gallium arsenide and observed also in some other materials. The conduction-band electrons in GaAs can be transferred by means of an external electric field from a low-energy state with high mobility to a higher-energy state with a lower mobility. Above a given threshold value of the electric field the average drift velocity of the electrons as a function of the electric field will decrease and a negative resistance can be obtained. FIG. 1 in the enclosed drawing is a diagram illustrating the average drift velocity $v$ of the electrons as a function of the electric field E. Below the threshold value $E_t$ the diode exhibits positive or ohmic resistance. Oscillation in Gunn-mode, as illustrated in FIG. 2 in the enclosed drawing which is a diagram of the current waveform I as a function of time $t$, is due to the fact that when the diode is biased above the threshold value, a disturbance in the shape of a high-field domain is formed at the cathode and travels through the diode to the anode. As a major portion of the external voltage applied across the diode is taken up this high-field domain, the electric field in the other parts of the diode outside of the high-field domain will be relatively low. As a consequence the current is low (point 1 in FIG. 2). When the high-field domain reaches and is absorbed at the anode, the outside field throughout the diode begins to rise and the current will increase (point 2 in FIG. 2). When the increasing electric field exceeds again its threshold value, a new high-field domain is nucleated at the cathode and the described process is repeated. The frequency of oscillation is determined by the transit-time of the high-field domains through the diode. If the diode is operated in a suitable resonant circuit (resonant cavity), the ac voltage can quench the high-field domain before it reaches the anode or delay the formation of a new domain at the cathode. Frequency tuning over more than one octave can also be achieved by giving the diode a suitable geometrical shape. The Gunn-diode can also be made to oscillate in the so called LSA-mode illustrated by the voltage-time diagram in the lower part of FIG. 1 in the enclosed drawing. In this mode of operation the negative resistance is utilized more directly. The condition for operation in this LSA-mode is that no disturbances, as for instance the high-field domains described in the foregoing, are permitted to grow, wherefore the internal electric field will be more uniform than in the domain mode and substantially proportional to the applied external voltage. The current, in turn, will be proportional to the drift velocity at the prevailing field level. The diode will consequently have a current-voltage characteristic of a similar shape as the velocity-field characteristic illustrated in FIG. 1. If such a diode is biased to more than twice the threshold voltage and is mounted in a resonant cavity having a high Q-value tuned to a high frequency, the disturbances or high-field domains do not have time to grow sufficiently during the time interval with the voltage above the threshold value, but will be quenched during the short time interval when the voltage is below the threshold value. The frequency is determined entirely by the resonant circuit, wherefore a large diode can be used also for generating high frequencies. Consequently, the output power, which is limited by the diode volume, can also be increased for a diode operating in the LSA-mode.

In avalanche diode, or more fully avalanche transit-time diodes, the negative resistance effect is based on the fact that at high electric fields the electrons and/or holes can generate new electron-hole pairs. During the space charge multiplication or avalanche breakdown the current increases due to the increased space charge concentration. Due to the transit-time through the diode for the charge carriers the current can be further delayed in phase relative to the voltage, whereby negative resistance will be achieved. In the Read diode the avalanche breakdown will take place when the ac voltage is positive. The current then increases from a low value. The space charges produced at the avalanche breakdown remain in the diode during the negative half period of the voltage and propagate through the diode. The frequency is selected to have such a value that the space charges reach the electrodes of the diode when the negative half period of the voltage is ended. In this manner a high current is obtained when the voltage is low and a low current when the voltage is high, i.e. a negative resistance is obtained. There exists various modes of operation depending on the avalanche breakdown mechanism and the phase displacement caused by the transit-time of the charge carriers through the diode. One mode of operation which has lately attracted an increasing interest is the so called TRAPATT-mode. It is so called because the electron and hole concentration in the diode has such a high value that the electric field in the central portion of the diode is reduced to a very low value, whereby the electrons and holes move very slowly (are trapped) in this low electric field. Characteristic for this mode of operation is the high efficiency amounting to 60 percent and the large current and voltage variations obtained. Briefly, the TRAPATT-mode of operation is based on following mechanism: When the bias voltage across the diode exceeds a given threshold value, avalanche breakdown will take place and a plasma with high concentrations of electrons and holes is formed in the material. The electrons move towards the positive electrode of the diode and the holes towards the negative electrode. Due to the concentration of electrons and holes the electric field is reduced in the central portion of the material. The electrons within the region with low electric field will have a negligible movability and are trapped. When the avalanche breakdown is interrupted, the electrons and holes collected at the opposite ends of the diode material are removed through the electrodes of the diode, whereby the electric field rises again above the threshold value and a new avalanche breakdown is initiated. Generally speaking it can be said that the diode is switched between two states, namely the avalanche breakdown state and the state described above with a trapped plasma. Also the avalanche diode has a current-voltage characteristic exhibiting a negative resistance, although the characteristic has a different shape from that of the Gunn-diode (S-shaped instead of N-shaped). When the avalanche diode is used as a microwave oscillator it is connected in the external circuits substantially in the same manner as described for the Gunn-diode.

SUMMARY OF THE INVENTION

The primary object of the invention is to provide a device for generating microwave oscillations based on the use of microwave generating semiconductor devices of the type described in the foregoing, in which device large ac-voltages and/or currents are produced in the microwave generating semiconductor devices and which has a higher reliability of operation than prior art microwave generating devices with respect to the initiation of the microwave oscillations as well as the subsequent maintenance of the oscillations. In particular it is the object of the invention to provide a microwave generating device of this kind, in which the semiconductor devices are caused to oscillate in modes which are not primarily dependent on the transit-time, as such modes of operation have, as explained in the foregoing, many advantages in view of a high output power at higher frequencies and/or a higher efficiency.

For these objects the invention provides a device for generating microwave oscillations comprising two semi-conductor devices of a kind which can be switched between two states or which becomes unstable or exhibits negative resistance when exposed to a dc voltage field or a dc current exceeding a given threshold value, as for instance Gunn-diodes or avalanche diodes, a microwave resonant cavity and a dc bias voltage source, said semiconductor devices being mounted within said resonant cavity and connected in series between the poles of said dc bias voltage source, and means being provided for coupling the junction point between the semiconductor devices to the resonant cavity so that the two semiconductor devices are driven in push-pull by ac microwave voltages derived from the resonant cavity and superimposed upon the dc bias voltages applied across the semiconductor devices from said dc voltage source.

In a device according to the invention, consequently, the ac microwave voltage produced across the resonant cavity is fed to the common junction point between the two semiconductor devices, which have their opposite electrodes mutually short-circuited with respect to ac voltages, whereby the instantaneous value of the ac microwave voltage derived from the resonant cavity is during a given half period added to the dc bias voltage in the one semiconductor device and subtracted from the dc bias voltage in the other semiconductor device. During the next half period of the ac microwave voltage the opposite condition will prevail. As a consequence hereof, there is always one semiconductor device which has a voltage exceeding the threshold voltage, which contributes to securing the maintenance of the desired state of oscillations. The initiation of oscillations, for instance in the LSA-mode in Gunn-diodes, is facilitated in a device according to the invention, because when the dc bias voltage has been applied and one of the diodes has been driven to an unstable state, the ac microwave voltage component fed back to the diodes from the resonant cavity through the microwave coupling means between the cavity and the common junction point of the diodes will always strive to move the working point of the one diode towards a higher voltage and that of the other diode towards a lower voltage. In this way the diodes assist each other and cooperate to increase the amplitude of oscillations so that the oscillation, which has been initiated for instance in the Gunn-mode, can automatically be transferred to the LSA-mode.

BRIEF DESCRIPTION OF THE DRAWINGS

In the following the invention will be further described with reference to the accompanying drawings, which illustrate by way of example some embodiments of a microwave generating device according to the invention. In the drawings.

DESCRIPTION OF THE PREFERRED EMBODIMENTS

Figure 1:
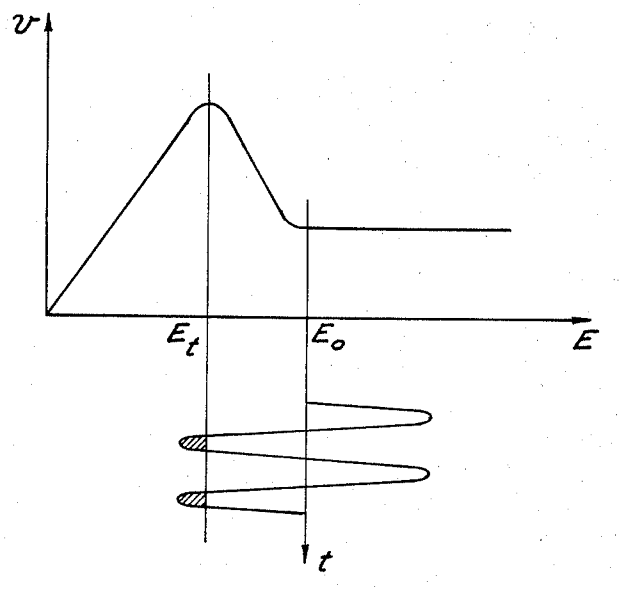
FIG. 1 is a diagram discussed in the foregoing illustrating the average drift velocity as a function of the electric field in a Gunn-diode.
Figure 2:
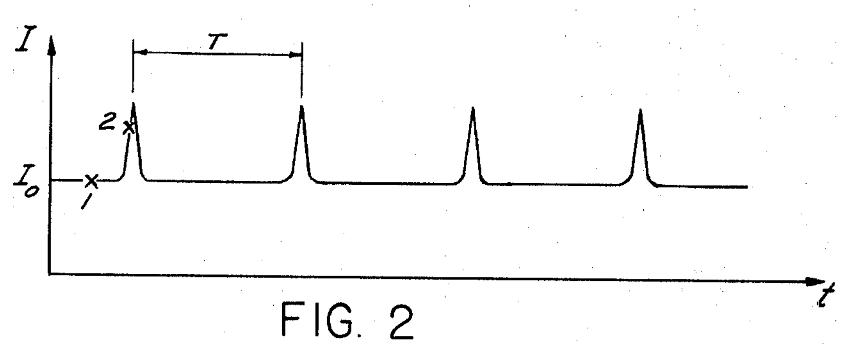
FIG. 2 is a diagram discussed in the foregoing illustrating the current as a function of time for a Gunn-diode oscillating in the Gunn or transit-time mode.
Figures 3, 4:
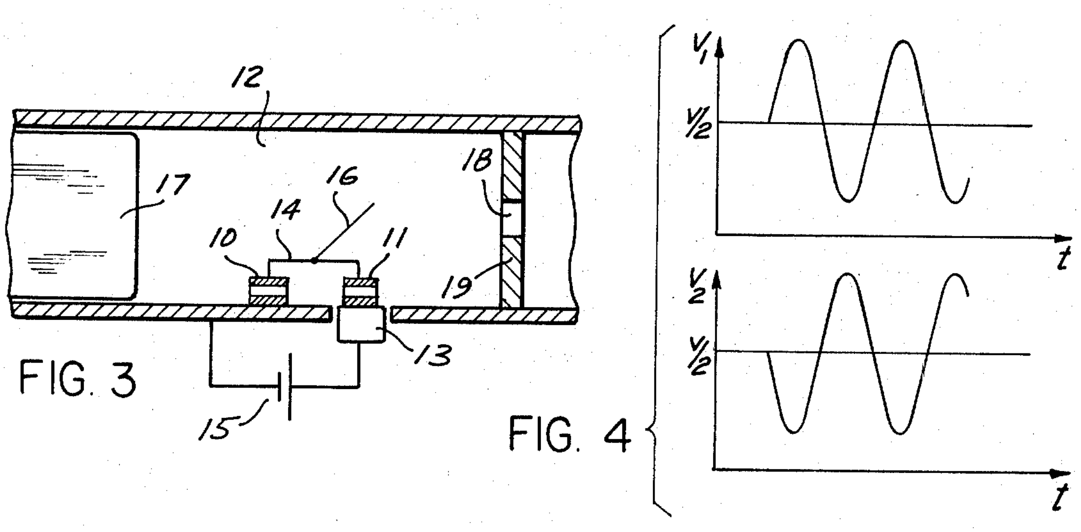
FIG. 3 illustrates schematically and in cross-section a microwave generating device according to the invention comprising two Gunn-diodes or avalanche diodes mounted in a waveguide section.
FIG. 4 is a diagram illustrating the voltage across the diodes in the device shown in FIG. 3 as a function of time for a sinusoidal microwave voltage.

FIG. 3 shows a microwave generating device according to the invention comprising two Gunn-diodes 10 and 11 mounted within a waveguide section 12. It should be noted that the diodes are shown on an exaggerated scale. The one diode 10 is mounted with its one electrode in direct electric contact with the waveguide wall, whereas the other diode 11 is mounted with its one electrode in contact with a metallic plug 13, which is mounted in an opening in the waveguide wall so as to be dc-insulated from the waveguide wall. The electrodes of the diodes facing the cavity of the waveguide are directly interconnected through a conductor 14, and a dc voltage source 15 is connected between the waveguide and the metallic plug so that the diodes are connected in series, with respect to dc, between the terminals of the dc voltage source 15. An antenna coupled to the microwave field within the waveguide section is connected to the conductor 14 between the diodes. The waveguide section is tuned by means of a short-circuiting wall 17 and the microwave energy is extracted from the waveguide through a coupling hole 18 in a wall 19 at the opposite end of the waveguide section.

FIG. 4 is a diagram of the voltages $V_1$ and $V_2$ respectively across the diodes as a function of time for a sinusiodal voltage waveform. In the diagram it has been assumed that the two diodes are identical, although this is not necessary for the intended operation of a device according to the invention, wherefore each diode will have a dc bias voltage equal to one half of the voltage V of the dc voltage source 15. As the ac microwave voltage fed back through the resonant cavity formed by the waveguide section 12, and the antenna 16 is applied to the diodes at their common junction point 14, an ac voltage component will always be added to the dc bias voltage in the one diode and subtracted from the dc bias voltage in the other diode, whereby the diodes are always operated exactly in push-pull.

The diodes in the device shown in FIG. 3 can be caused to oscillate in the LSA-mode. For oscillation in the LSA-mode it is necessary, as explained in the foregoing, that the voltage is below the threshold voltage once during each period in order to quench the field domains being formed. This is facilitated in the device according to the invention due to the fact that one diode strives to take up a high voltage and in this manner reduces the voltage substantially across the other diode. During the next half period the diodes will play opposite roles. In this way large ac voltages are more effectively sustained. The circuit according to the invention facilitates also the initiation of oscillations in the LSA-mode. This is possible because, when the dc bias voltage has been applied to the diodes and the one diode has been driven into an unstable state and thus the formation of a high-field domain has started, ac energy with the resonance frequency is fed back with such a high amplitude to the antenna 16 that oscillations in the LSA-mode can start.

Figure 5:
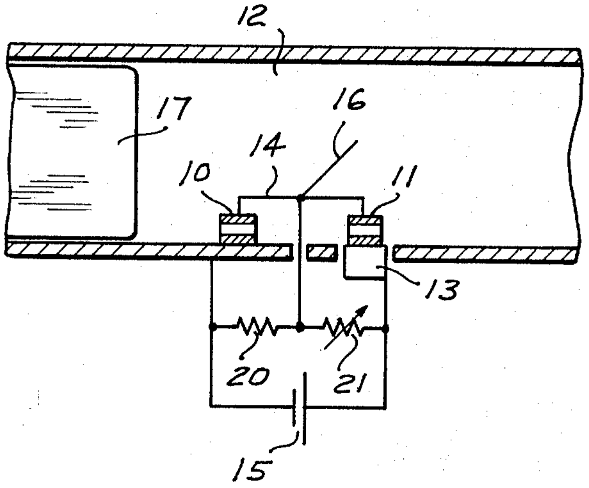
FIG. 5 illustrates in a manner similar to that in FIG. 3 a modification of the device illustrated in FIG. 3.

The diodes 10, 11 in the device according to FIG. 3 are preferably so selected as to have approximately the same electric field when the same current flows though them. If the diodes are very different, it may be necessary to use a modified arrangement as illustrated in FIG. 5. In this modified device a dc voltage divider 20, 21 is connected across the terminals of the voltage source 15 with the tap of the divider connected to the junction point 14 between the diodes. The one resistance 21 in the voltage divider is variable so as to make it possible to adjust the dc potential of the junction point 14 on a desired value.

Figure 6:
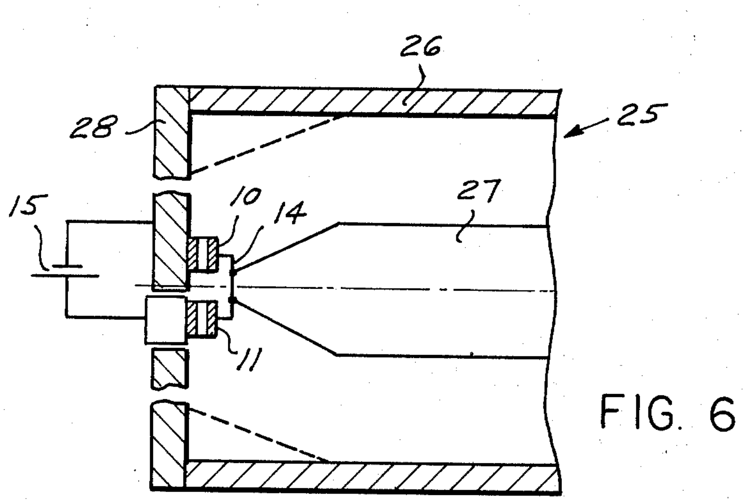
FIG. 6 illustrates schematically in cross-section a second embodiment of a microwave generating device according to the invention comprising two diodes mounted in a coaxial cavity.

FIG. 6 shows another embodiment of the invention, in which the Gunn-diodes are instead mounted in a coaxial cavity. Corresponding components in the device illustrated in FIG. 6 are designated with the same reference numerals as in FIG. 3. The coaxial cavity 25 consists of an outer tubular conductor 26 and an inner central conductor 27. The coaxial cavity is closed by an end wall 28, on which the two series connected diodes 10, 11 are mounted opposite to the central conductor 27. The microwave coupling between the diodes and the resonant cavity consists in this case of a galvanic connection between the conductor 14 interconnecting the two diodes and the central conductor 27 in the coaxial cable. The outer conductor 26 can be joined to the end wall 28 of the coaxial cable through a tapered section as indicated by dotted lines in FIG. 6 in order to provide a better matching at the end wall of the coaxial.

In the same way as in the device illustrated in FIG. 3 a microwave voltage appearing between the inner conductor and the outer conductor of the coaxial cavity will drive the two diodes in push-pull, wherefore the mode of operation is substantially the same as described in connection with FIG. 3.

Figure 7:
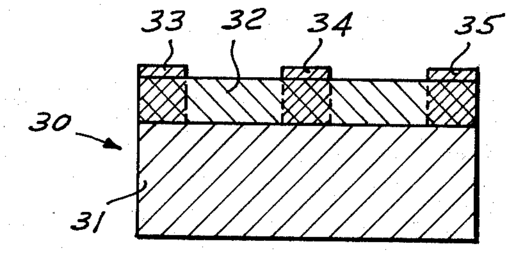
FIG. 7 illustrates schematically and in cross-section an advantageous design of the microwave generating diodes used in a device according to the invention.

FIG. 7 illustrates schematically an advantageous design of the two diodes in a device according to the invention, where the diodes are formed by the planartechnique in a common semiconductor wafer so as to form a monolithic component. In FIG. 7, 30 is a wafer of GaAs including a high resistive base layer 31 and a semiconducting layer 32. Three metallic electrodes 33, 34 and 35 are diffused into the semiconducting layer 32. The region between the central electrode and one of the outer electrodes forms the one diode and the region between the central electrode and the second outer electrode forms the other diode. The central electrode 34 will also constitute the common junction point between the two diodes.

A device according to the invention can also be made to oscillate in other modes, for example the inhibited or delayed domain mode. This oscillation mode in Gunn-diodes is based upon the use of a resonant circuit tuned to a lower frequency than the transit-time frequency of the diode. The voltage across the diode is selected so as to be lower than the threshold voltage at the instant a disturbance (accumulation layer or high-field domain) reaches the anode. Then the formation of a new disturbance is delayed until the voltage rises above the threshold value.

In particular, if the resonant circuit is designed to maintain a square waveform with a fundamental frequency equal to half the transit-time frequency of the diode, a high efficiency amounting to up to 30 percent can be reached at high voltage amplitudes.

During the positive half period of the square-wave voltage a high-field domain or accumulation layer is formed and the current will be low. When the negative half period starts this disturbance reaches the anode. The total voltage should then be immediately below the threshold value so that no new disturbance can be formed during the negative half period. A high current is reached during this half period, i.e. the current response on a square-wave voltage will be a square wave-current in opposite phase (negative resistance).

The Gunn-diode is a voltage-controlled microwave generating device. The circuit arrangement according to the invention may, however, be used just as well for current-controlled microwave generating devices, as for instance avalanche diodes, in which an avalanche breakdown shall be initiated and quenched. Alternatively, also other devices with corresponding properties may be used. Instead of sinusoidal voltage, a square-wave voltage may preferably be applied to the diodes, which gives a higher efficiency. There is noting that prevents the use of other suitable waveforms, as for example the fundamental plus the second harmonic at the LSA-mode or the fundamental plus subharmonics at avalanche diodes. The dc voltage source can also be replaced with a pulsed voltage source. Furthermore, in order to increase the output power two or more semiconductor devices may be coupled to each other with respect to the microwave ac signal, for example by means of antennas.

I claim:

1. A device for generating microwave oscillations comprising two semiconductor devices of a kind capable of being switched between two states or becoming unstable or exhibiting negative resistance when exposed to a dc voltage field or a dc current exceeding a given threshold value, a microwave resonant cavity, and a dc bias voltage source, said two semiconductor devices being mounted within said resonant cavity and connected in series between the terminals of said bias voltage source, and microwave coupling means coupling the common junction point between said semiconductor devices to the microwave field of said resonant cavity so that said two semiconductor devices are driven in push-pull by ac microwave voltages derived from said resonant cavity and superimposed upon dc bias voltages derived from said bias voltage source.

2. A device as claimed in claim 1, wherein said semiconductor devices are Gunn-diodes.

3. A device as claimed in claim 1, wherein said semiconductor devices are avalanche diodes.

4. A device as claimed in claim 1, wherein said two semiconductor devices are matched to have substantially equally large dc voltage fields.

5. A device as claimed in claim 1, comprising circuit means for determining the dc potential of the common junction point between said two semiconductor devices.

6. A device as claimed in claim 5, wherein said circuit means include a dc voltage divider connected between the terminals of said dc bias voltage source and having a tap connected to said common junction point between said semiconductor devices.

7. A device as claimed in claim 1, wherein said dc bias voltages and the Q-value of said resonant cavity are sufficiently high to prevent travelling high-field domains in said semiconductor devices from growing and determining the oscillation mode.

8. A device as claimed in claim 1, wherein said microwave resonant cavity includes a waveguide section provided with tuning means, said semiconductor devices being mounted adjacent each other on the inside of the wall in said waveguide section.

9. A device as claimed in claim 8, wherein said microwave coupling means include antenna means connected to the common junction point between said semiconductor devices and coupled to the electromagnetic microwave field within said waveguide section.

10. A device as claimed in claim 1, wherein said microwave resonant cavity includes a coaxial cavity having an outer tubular conductor terminated at one end of the cavity by a short-circuiting end wall and an inner central conductor terminated at a short distance from said end wall, said two semiconductor devices being mounted on the inner surface of said end wall opposite said central conductor.

11. A device as claimed in claim 9, wherein said microwave coupling means include a galvanic connection from the common junction point between said semiconductor devices to said central conductor.

12. A device as claimed in claim 1, comprising at least one additional pair of semiconductor devices arranged in a manner similar to that of said two first mentioned semiconductor devices and microwave-coupled thereto.

13. A device as claimed in claim 1, wherein said two semiconductor devices are formed by planar-technique in a common semiconductor wafer as a monolithic component with three electrodes, one of said electrodes constituting said common junction point.

* * * * *